(12) United States Patent
Bell et al.

(10) Patent No.: US 6,396,411 B1
(45) Date of Patent: May 28, 2002

(54) RELIABLE AND FAST FRAME SYNCHRONIZATION SCHEME FOR FLEX PAGING PROTOCOL

(75) Inventors: Dwane A. Bell; Xiao-an Wang, both of Allentown, PA (US)

(73) Assignee: Agere Systems Guardian Corp., Allentown, PA (US)

( * ) Notice: Subject to any disclaimer, the term of this patent is extended or adjusted under 35 U.S.C. 154(b) by 0 days.

(21) Appl. No.: 09/244,995

(22) Filed: Feb. 4, 1999

(51) Int. Cl.[7] .................................................. H04L 7/00
(52) U.S. Cl. ................... 340/825.2; 340/7.43; 340/7.34
(58) Field of Search ................................ 340/7.26, 7.34, 340/7.38, 7.43, 825.2, 825.21, 7.44; 370/503, 506, 508, 509, 512, 350; 455/502

(56) References Cited

U.S. PATENT DOCUMENTS

| 5,168,493 A | * 12/1992 | Nelson | 370/314 |
| 5,646,589 A | 7/1997 | Murray et al. | 340/7.58 |
| 5,649,315 A | 7/1997 | Eaton | 455/343 |
| 5,675,627 A | 10/1997 | Yaker | 455/558 |
| 5,805,978 A | 9/1998 | Souissi et al. | 340/7.21 |
| 5,809,411 A | 9/1998 | Kudoh et al. | 455/348 |
| 5,828,995 A | 10/1998 | Satyamurti et al. | 358/1.18 |

* cited by examiner

Primary Examiner—Nguyen T. Vo
Assistant Examiner—James Moore
(74) Attorney, Agent, or Firm—Dickstein Shapiro Morin & Oshinsky LLP

(57) ABSTRACT

A method and apparatus that utilizes soft outputs from a paging device demodulator to perform frame synchronization is provided. The soft outputs are summed after being correlated to a first pattern associated with a paging protocol. The summation is then compared to a frame synchronization threshold. Frame synchronization occurs when the summation reaches the threshold. Using soft outputs, and a summation of the outputs based on a correlation with the first pattern, the method and apparatus require less processing, are more efficient and are more reliable than conventional synchronization schemes.

54 Claims, 4 Drawing Sheets

RELIABLE AND FAST FRAME SYNCHRONIZATION SCHEME FOR FLEX PAGING PROTOCOL

BACKGROUND OF THE INVENTION

1. Field of the Invention

The present invention relates to the field of paging devices and, more particularly to a reliable and fast frame synchronization scheme for FLEX protocol paging devices.

2. Description of the Related Art

The use of paging devices has increased dramatically over the years. Paging allows a person to contact a user of a paging device even in situations where the user is not in close proximity of a telephone. Paging devices allow the calling party to leave a telephone number where the party can be reached and/or a textual message such as "CALL TOM" so that the purpose of the "page" is apparent to the user.

Due to recent developments, paging is being performed at higher speeds and with increased data capacity. The developments are attributable to the FLEX paging protocol that has quickly become the industry standard. In addition, newly developed power management techniques designed for use with the FLEX protocol have increased the battery power-savings capability of the paging devices.

The power-savings result from the fact that a pager designed to operate with the FLEX protocol will remain in a dormant low-power "standby" mode for almost the entire time that the paging device is powered-on. Once every four minutes, the paging device "wakes up" from the dormant standby mode and determines if there are any incoming messages destined for that paging device. Any incoming messages are processed and the paging device resumes the standby mode. Older protocols required the paging device to continuously check for incoming messages which quickly reduced the life of the pager's batteries. Battery savings is a major concern in the paging industry and the FLEX protocol increases the battery savings of paging devices.

Referring to FIGS. 1 and 2, the paging device can remain dormant for long periods of time because the FLEX protocol uses a synchronous time-slotted frame format having a data-frame cycle 10 lasting four minutes. Each cycle 10 contains one hundred and twenty-eight data packets or frames 20 that are transmitted once during each cycle 10. Each frame 20 lasts approximately 1.875 seconds and has a preferred base data rate of 6400 bits per second. The FLEX protocol also supports data rates of 1600 and 3200 bit per second.

Each frame 20 contains a first bit synchronization portion 22 (hereinafter referred to as "bit sync #1"), first rate information portion 24 (hereinafter referred to as "rate info #1"), second bit synchronization portion 26 (hereinafter referred to as "bit sync #2"), second rate information portion 28 (hereinafter referred to as "rate info #2") and eleven message block portions 30.

As shown in FIG. 2, bit sync #1 is a 32-bit pattern comprising alternating 1's and 0's. Bit sync #2 is a 16-bit pattern comprising alternating 0's and 1's. Rate info #1 is a 32-bit pattern containing the data rate of the frame while rate info #2 is a 32-bit pattern containing the complement of rate info #1. As is known in the art, the message blocks 30 contain the address of the pager that will receive the message and message information.

In general, each paging device is assigned a frame 20 within a cycle 10. To determine if the paging device has an incoming message, the paging device must wake up and synchronize itself to its assigned frame 20. Once synchronized, the paging device checks the remainder of the frame to determine if there is an incoming message destined for the address of the paging device. If there is no incoming message, the paging device resumes its standby mode. If there is an incoming message, the paging device processes the message and then resumes its standby mode. The process is repeated once every four minutes, i.e., once every cycle.

FIG. 3 illustrates the synchronization process 60 currently performed by conventional paging devices. The process 60 begins by reading a bit input from the assigned frame (step 62) and updating the last thirty-two input bits with the new input bit (step 64). A bit-by-bit comparison is made between the last thirty-two input bits and the bit sync #1 pattern (step 66) to determine a number of matches between the two. Once the number of matches between the last thirty-two input bits and the bit sync #1 pattern is obtained, it is determined if the number of matches is greater than or equal to a predetermined threshold T (step 68). Since the input bits may be corrupted by noise or other adverse conditions, a threshold T less than thirty-two is typically used. If the number of matches is greater than or equal to the threshold T, the frame is in sync (step 70) and the process 60 is complete. Upon completion of the process 60, further message processing is performed by the paging device. If the number of matches is not greater than or equal to the threshold T, the process continues at step 62 where the next input bit is read and the process 60 continues until there is a frame synchronization (at step 70).

The synchronization process 60 is not without its shortcomings. For example, the bit-by-bit comparisons used to determine whether there is a match between the input bits and the bit sync #1 pattern are made using "hard-decision" bits (that is, the decision is based on 1's and 0's). The bit-by-bit comparison resulting in the number of matches between the bit sync #1 pattern and the input data is performed using the hard-decision numbers means that any incorrect hard-decisions values will corrupt the number of matches. Thus, the process 60 is not too reliable. Accordingly, there is a desire and need for a reliable frame synchronization scheme for a paging device utilizing the FLEX paging protocol.

In addition, the process 60 is currently implemented in the software controlling the paging device. The hard-decisions and the bit-by-bit comparisons used to determine the number of matches between the input bits and the bit sync #1 pattern require numerous programming operations. The numerous programming operations slow down the processing required to perform the frame synchronization.

The reliability of the conventional frame synchronization process 60 can be improved by further considering bit-by-bit comparisons and the number of matches between the input data and the bit sync #2 or frame info patterns. These additional matches, however, add additional programming operations and processing time to the frame synchronization and would be inefficient. An inefficient and slow frame synchronization scheme is undesirable. Accordingly, there is a desire and need for a reliable frame synchronization scheme for a paging device utilizing the FLEX paging protocol that can be performed quickly and efficiently.

SUMMARY OF THE INVENTION

The present invention provides a reliable frame synchronization scheme for a paging device utilizing the FLEX paging protocol.

The present invention also provides a reliable frame synchronization scheme for a paging device utilizing the FLEX paging protocol that can be performed quickly and efficiently.

The above and other features and advantages of the invention are achieved by providing a method and apparatus that utilizes soft outputs from a paging device demodulator to perform frame synchronization. The soft outputs are summed after being correlated to a first pattern associated with a paging protocol. The summation is then compared to a frame synchronization threshold. Frame synchronization occurs when the summation reaches the threshold. Using soft outputs, and a summation of the outputs based on a correlation with the first pattern, the method and apparatus require less processing, are more efficient and are more reliable than conventional synchronization schemes.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

The invention is implemented on a conventional paging device by the provision of some additional programming of the paging device processor to enable the device to carry out the operations described herein. The invention may be implemented in any conventional paging device which includes a processor to control the complex functions of the device. Thus, the invention is not restricted to any particular paging device circuit architecture.

Figure 4:
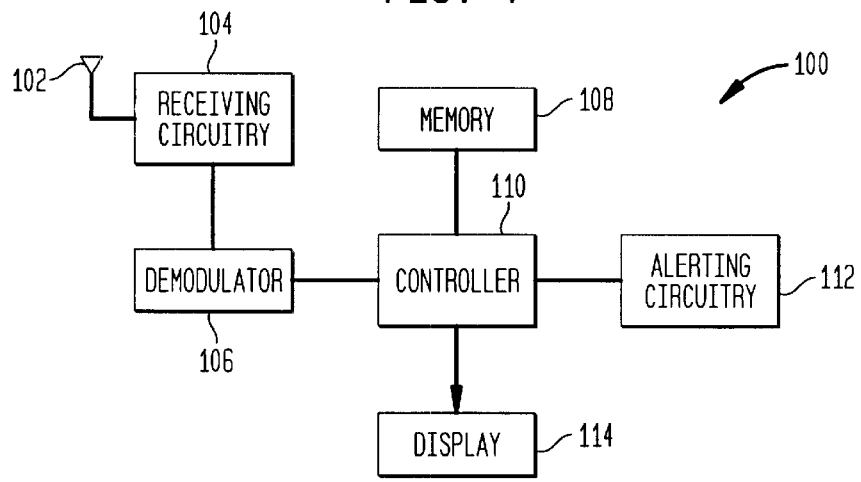
FIG. 4 illustrates in block diagram form an exemplary paging device constructed in accordance with the present invention.

FIG. 4 illustrates a high-level block diagram of a representative paging device 100 for performing the frame synchronization method of the present invention. The device 100 includes an antenna 102, receiving circuit 104, demodulator 106, memory circuit 108, controller 110, alerting circuitry 112 and a display 114.

The antenna 102 is coupled to the receiving circuit 104. The receiving circuit 104 is also coupled to a demodulator 106. The demodulator is also coupled to a controller 110. The controller 110 may be a digital signal processor, microcomputer or other processor capable of being programmed to perform the functions of a paging device. The controller 110 is also coupled to the memory circuit 108, display 114 and the alerting circuitry 112. The components are all conventional and cooperate together to perform the functions of a conventional paging device 100. Examples of paging devices and their operation can be found in U.S. Pat. No. 5,649,315 (Eaton) and U.S. Pat. No. 5,646,589 (Murray et al) which are hereby incorporated by reference in their entirety.

As is known in the art, the receiving circuit 104 receives radio frequency (RF) page signals from the antenna 102, processes the RF signals and passes the processed signals to the demodulator 106. Typical processing performed by the receiving circuit 104 includes amplification, modulation and filtering of the received RF signals. The demodulator 106 receives the signals from the receiving circuit 104, demodulates the signal and delivers the demodulated signal to the controller 110. The controller 110 attempts to synchronize to the demodulated signal. Synchronization according to the present invention will be described below in detail with reference to FIGS. 5 and 6. Once the controller 110 is synchronized to the input signal, the signal is inspected to see if there is a message for this paging device 100. If there is a message for the paging device 100, the controller 110 processes it, displays it on the display 114 and/or sends a signal to the alerting circuitry 112 which alerts the user of the device 100 that an incoming page has been received.

Program instructions, as well as data required by the controller 110, are stored in the memory circuit 108. The programming instructions stored in the memory 108 will include instructions required by the controller 110 to perform the conventional functions of a paging device 100 (as disclosed in the '315 and '589 patents) as well as instructions to carry out the frame synchronization method of the present invention. In addition, outputs from the demodulator 106 are used as inputs by the controller 110 as is described below with reference to FIGS. 5 and 6.

Figure 3:
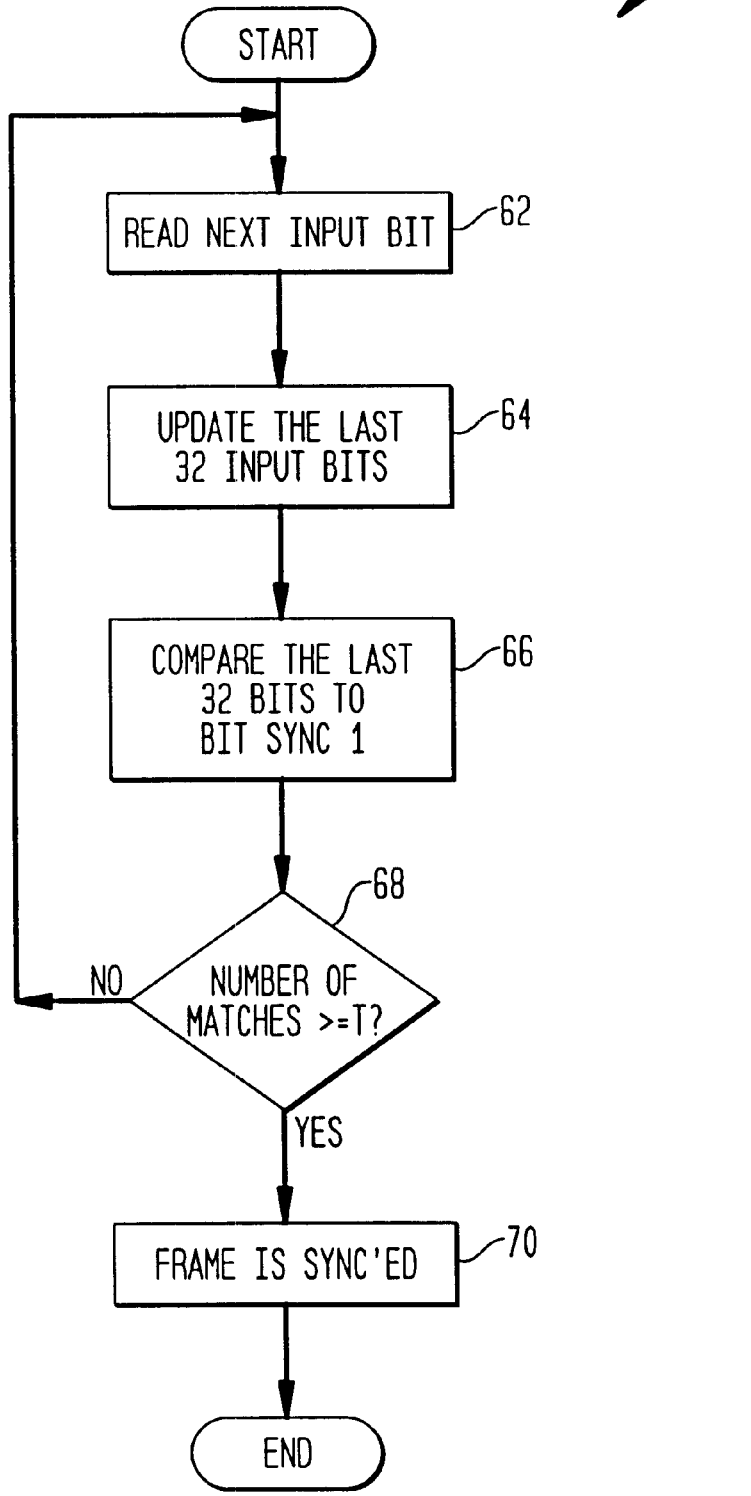
FIG. 3 illustrates the synchronization process performed by conventional paging devices.
Figure 5:
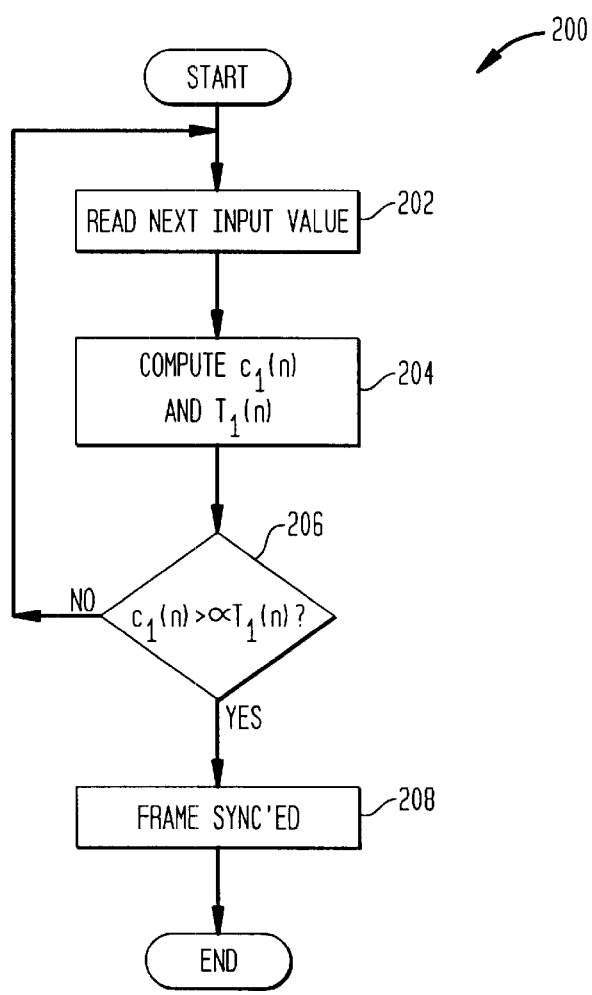
FIG. 5 is a flow chart illustrating a first embodiment of a frame synchronization process performed by the present invention.

FIG. 5 is a flow chart illustrating a first embodiment of a frame synchronization process 200 performed by the present invention. The process 200 begins by reading an input value received from the demodulator (i.e., an output from the demodulator) from the frame assigned to the paging device (step 202). Unlike the conventional frame synchronization process 60 (illustrated in FIG. 3), the process 200 of the present invention reads in the soft outputs from the demodulator, not a hard-decision output created from the soft output. As is known in the art, the demodulator of a paging device outputs "soft" or multi-bit outputs corresponding to a real number (e.g., 0.8). In the conventional paging devices, once the soft output is received by the paging device's controller, a decision is made as to whether this multi-bit real number represents a −1 or a +1 (known in the art as a hard-decision). Therefore, in the conventional frame synchronization process 60 (illustrated in FIG. 3), the multi-bit demodulator outputs are being converted to a 1-bit value corresponding to either a −1 (represented by a logic 0) or +1 (represented by a logic 1). The process 200 of the present invention inputs the actual real number value that is output by the demodulator. Therefore, there is no need to perform the hard-decision on the demodulator output to create input bits representing either a −1 or a +1 as required by the conventional process 60 (FIG. 3). This saves processing time since the hard decision is not being performed. The reliability of the frame synchronization process 200 is also greatly improved since no conversions or hard-decisions are being performed and thus, no information concerning the value of the demodulator outputs is being lost.

As will become apparent, the process 200 is designed to operate on thirty-two values input from the demodulator. As in the process 60 (FIG. 3), the step of inputting the first thirty-one input values is not shown in FIG. 5. Once at least thirty-two input values are read in, the last thirty-two input values are correlated $c_1(n)$ to the bit sync #1 pattern (step 204). A threshold $T_1(n)$ for the correlation $c_1(n)$ is also calculated at step 204.

The correlation $c_1(n)$ and the threshold $T_1(n)$ are computed as follows. In the following equations, $x(n)$ is the current input value received from the demodulator, $n$ is an index associated with the current input value and the last thirty-two input values are represented as $x(n-31)$, $x(n-30)$, ... $x(n-1)$, $x(n)$. The correlation $c_1(n)$ and the threshold $T_1(n)$ are calculated as follows:

$$c_1(n) = \sum_{k=0}^{31} x(n-k)b(k),$$

$$T_1(n) = \sum_{k=0}^{31} |x(n-k)|,$$

where $k$ is a bit position, $b(k)$ is the bit sync #1 pattern at position $k$, $b(k)=1$ if the corresponding bit in the bit sync #1 pattern is a 1 and $b(k)=-1$ if the corresponding bit in the bit sync #1 pattern is 0. It must be noted that the input values $x(n)$, etc. are being correlated to the bit sync #1 pattern and are then added to form a summed correlation $c_1(n)$, and are not being not matched bit-by-bit as performed in the conventional process 60 (FIG. 3). Using the above equations, it is apparent that there will be a large value for the correlation $c_1(n)$ when there is a frame synchronization and a low value when there is no frame synchronization.

Referring again to FIG. 5, at step 206, the correlation $c_1(n)$ is compared to the threshold $T_1(n)$ to determine if a frame synchronization has occurred. To account for some noise that may corrupt the input values, the threshold $T_1(n)$ is multiplied by a constant $\alpha$, where $0<\alpha<1$, to form a modified threshold $\alpha T_1(n)$. Preferably, the constant $\alpha=0.83$. If the correlation $c_1(n)$ is greater than the modified threshold $\alpha T_1(n)$, then a frame synchronization has occurred (step 208) and the process 200 is complete. If the correlation $c_1(n)$ is not greater than the modified threshold $\alpha T_1(n)$, then a frame synchronization has not occurred and the process 200 continues at step 202 where the next input value is read in. The process 200 continues until there is a frame synchronization (i.e., $c_1(n)>\alpha T_1(n)$).

It should be appreciated that the process 200 does not perform a bit-by-bit comparison between the input values received from the demodulator and the bit sync #1 pattern. The input values are summed after being correlated to the bit sync #1 pattern. Using the above equations and using input values corresponding to the soft outputs from the demodulator, the process 200 is faster, more reliable and thus, more efficient than the convention frame synchronization process 60 (FIG. 3).

Figure 1:
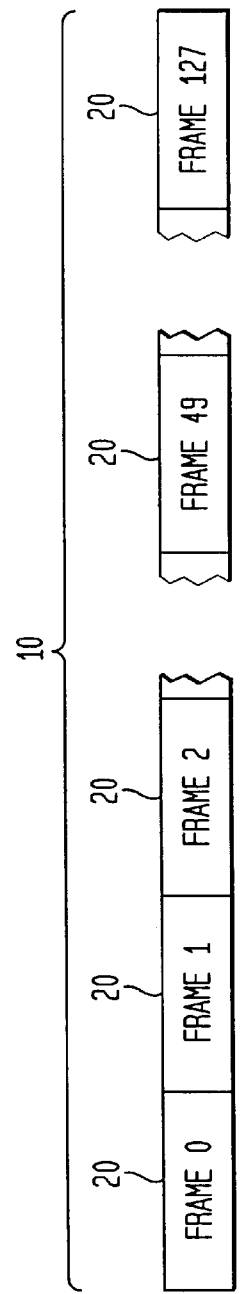
FIGS. 1 and 2 illustrate a data cycle of the FLEX paging protocol.
Figure 2:
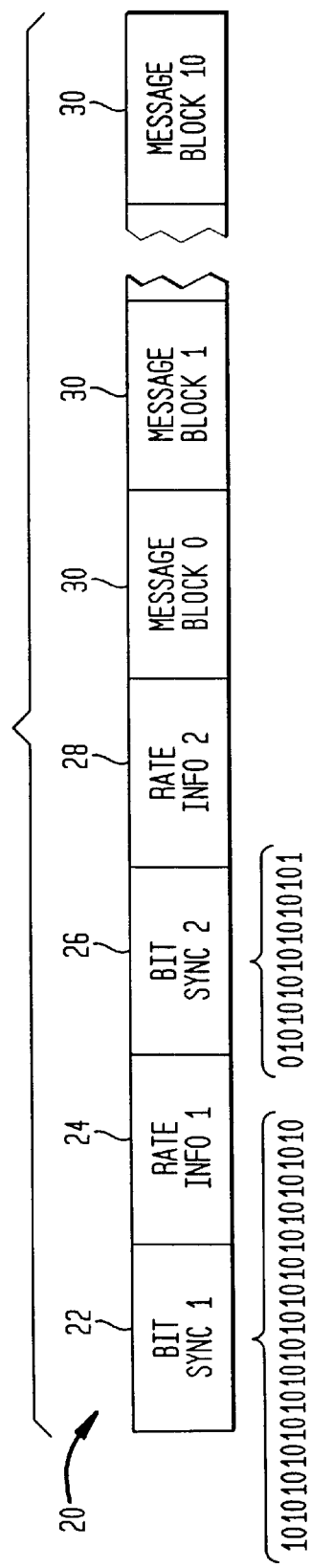

It has been determined that the above correlation $c_1(n)$ and threshold $T_1(n)$ computations can be greatly reduced by taking advantage of the knowledge of the bit synchronization patterns within the FLEX protocol data frame (see FIGS. 1 and 2). The above correlation $c_1(n)$ and threshold $T_1(n)$ computations can be reduced to:

$$c_1(n)=x(n)-x(n-32)-c_1(n-1)$$

and $$T_1(n)=|x(n)|-|x(n-32)|+T_1(n-1),$$

where $c_1(n-1)$ is the previous correlation and $T_1(n-1)$ is the previous threshold.

It should be appreciated that the correlation $c_1(n)$ computation has been reduced to merely two subtractions and the threshold $T_1(n)$ computation has been reduced to a subtraction and one addition. Thus, the processing time of these computations has been reduced even more. These new equations for the correlation $c_1(n)$ and threshold $T_1(n)$ could be used in the process 200. However, since potential errors may occur if the incoming signal is slightly misaligned, any declared frame synchronization (i.e., where $c_1(n)>\alpha T_1(n)$) should be confirmed by an additional comparison of the input values to another portion of the data frame.

Figure 6:
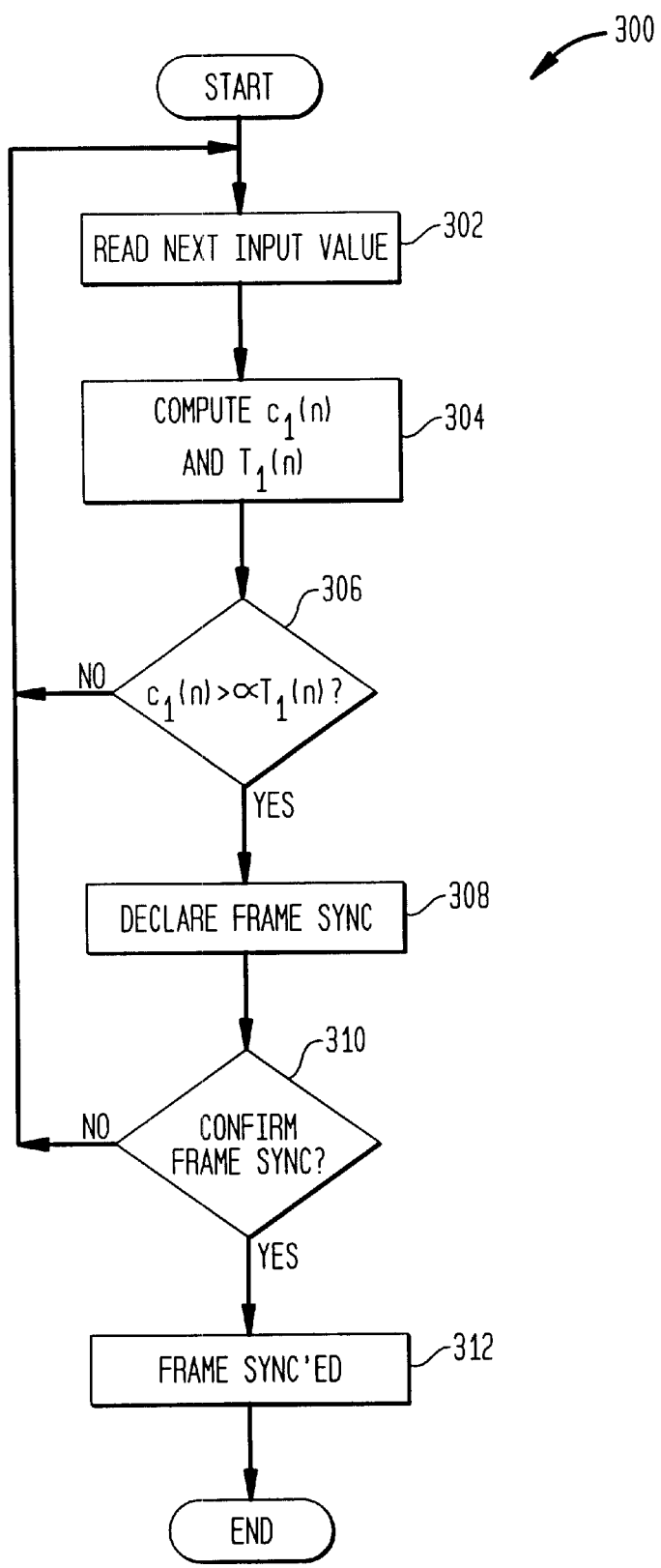
FIG. 6 is a flow chart illustrating a second embodiment of a frame synchronization process performed by the present invention.

Accordingly, FIG. 6 is a flow chart illustrating a second embodiment of a frame synchronization process 300 performed by the present invention. The process 300 begins by reading an input value received from the demodulator (i.e., an output from the demodulator) from the frame assigned to the paging device (step 302). Similar to the process 200 (FIG. 5) and unlike the conventional frame synchronization process 60 (illustrated in FIG. 3), the process 300 reads in the soft outputs from the demodulator, not a hard-decision output created from the soft output. Once at least thirty-two input values are read in, the last thirty-two input values are correlated to the bit sync #1 pattern to form a first correlation $c_1(n)$ (step 304). A first threshold $T_1(n)$ for the first correlation $c_1(n)$ is also calculated at step 304. As stated above, the first correlation $c_1(n)$ and the first threshold $T_1(n)$ are computed as follows:

$$c_1(n)=x(n)-x(n-32)-c_1(n-1)$$

and $$T_1(n)=|x(n)|-|x(n-32)|+T_1(n-1),$$

where $c_1(n-1)$ is the previous correlation and $T_1(n-1)$ is the previous threshold, $x(n)$ is the current input value, $n$ is an index associated with the current input value and the last thirty-two input values are represented as $x(n-31)$, $x(n-30)$, ... $x(n-1)$, $x(n)$. Using the above equations, it is apparent that there will be a large value for the first correlation $c_1(n)$ when there is a frame synchronization and a low value when there is no frame synchronization.

Referring again to FIG. 6, at step 306, the first correlation $c_1(n)$ is compared to the first threshold $T_1(n)$ to determine if a frame synchronization has occurred. To account for some noise that may corrupt the input values, the first threshold $T_1(n)$ is multiplied by a constant $\alpha$, where $0<\alpha<1$, to form a modified first threshold $\alpha T_1(n)$. Preferably, the constant $\alpha=0.83$. If the first correlation $c_1(n)$ is greater than the modified first threshold $\alpha T_1(n)$, then a frame synchronization is declared (step 308). As stated above, the declared frame synchronization will be confirmed at step 310.

At step 310 the declared frame synchronization is confirmed by a second correlation $c_2(n)$ that correlates the input values to the rate info #1 and rate info #2 patterns (FIGS. 1 and 2). This second correlation $c_2(n)$ will be compared to a second threshold $T_2(n)$. The second correlation $c_2(n)$ and second threshold $T_2(n)$ are computed as follows:

$$-c_2(n) = \sum_{k=0}^{31} -x(n+32-k)x(n+80-k) \text{ and}$$

$$\beta T_2(n) = \sum_{k=0}^{31} |x(n+32-k)x(n+80-k)|,$$

where $0<\beta<1$. Preferably, $\beta$ is 0.83. Continuing at step 310, the second correlation $c_2(n)$ is then compared to the second threshold $T_2(n)$ as follows:

$$-c_2(n)>\beta T_2(n).$$

If the second correlation $c_2(n)$ exceeds the threshold, then the declared frame synchronization has been confirmed and the frame is in sync (step 312). If the second correlation $c_2(n)$ does not exceed the second threshold $\beta T_2(n)$, then the frame synchronization has not been confirmed and the process 300 continues at step 302 where the next input value is read in. The process 300 continues until there is a declared frame synchronization (i.e., $c_1(n) > \alpha T_1(n)$) and that declared frame synchronization is confirmed (i.e., $-c_2(n) > \beta T_2(n)$).

If at step 306, the first correlation $c_1(n)$ is not greater than the first modified threshold $\alpha T_1(n)$, then a frame synchronization has not occurred and the process 300 continues at step 302 where the next input value is read in. The process 300 continues until there is a declared frame synchronization (i.e., $c_1(n) > \alpha T_1(n)$) and that declared frame synchronization is confirmed (i.e., $-c_2(n) > \beta T_2(n)$).

It has been determined that the above second correlation $c_2(n)$ and second threshold $T_2(n)$ computations can be greatly reduced by taking advantage of the knowledge of the bit synchronization patterns within the FLEX protocol data frame (see FIGS. 1 and 2). The above second correlation $c_2(n)$ and second threshold $T_2(n)$ computations can be reduced to:

$$c_2(n) = c_2(n-1) + x(n)x(n+48) - x(n+32)x(n+80)$$

and $$T_2(n) = T_2(n-1) + |x(n)x(n+48) - x(n+32)x(n+80)|,$$

where $c_2(n-1)$ is the previous computed second correlation and $T_2(n-1)$ is the previous computed second threshold.

The present invention is implemented in software and the software instructions and data can be stored in PROM, EEPROM or other non-volatile memory of the paging device. The program embodying the present invention can be stored on a hard drive, floppy disc, CD-ROM or other permanent or semi-permanent storage medium and subsequently transferred to the memory of the paging device. The program embodying the present invention can also be divided into program code segments, downloaded, for example, from a server computer or transmitted as a data signal embodied in a carrier wave to the paging device as is known in the art. In addition, the present invention can be implemented in hardware or a combination of hardware and software. In particular, the controller of the present invention can be implemented in an application specific integrated circuit (ASIC), a digital signal processor, microcomputer or other processor capable of being programmed to perform the functions of the paging device and the present invention.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of performing frame synchronization in a paging device comprising:
   a) inputting a plurality of values associated with a frame of data;
   b) correlating said plurality of input values to a first pattern associated with a paging protocol;
   c) summing said correlated plurality of input values to obtain a first summed correlation value; and
   d) determining that synchronization has occurred if said first summed correlation value reaches a first synchronization threshold,
wherein said first synchronization threshold comprises a summation of a number of said plurality of input values.

2. The method of claim 1 further comprising:
   e) if said first summed correlation has not reached said first synchronization threshold in step (d), then reading a next input value and dropping a prior input value; and
   f) repeating steps (b) through (f) until said first summed correlation value reaches said threshold in step (d).

3. The method of claim 1 wherein said plurality of input values comprise a soft output from a demodulator of said paging device.

4. The method of claim 1 wherein said first synchronization threshold comprises a summation of thirty-two input values.

5. The method of claim 1 wherein said first synchronization threshold comprises a summation of a number of said plurality of input values reduced by a first constant.

6. The method of claim 5 wherein said first constant is selected from a range of 0 to 1.

7. The method of claim 6 wherein said first constant is approximately 0.83.

8. A method of performing frame synchronization in a paging device comprising:
   a) inputting a plurality of values associated with a frame of data;
   b) correlating said plurality of input values to a first pattern associated with a paging protocol;
   c) summing said correlated plurality of input values to obtain a first summed correlation value; and
   d) determining that synchronization has occurred if said first summed correlation value reaches a first synchronization threshold,
wherein each of said plurality of input values respectively correspond to a data value of a respective bit position within said associated frame of data and said correlating step is performed by multiplying a number of said input values with an associated expected value of said first pattern for the respective bit position.

9. The method of claim 8 wherein said number of correlated input values is thirty-two.

10. A method of performing frame synchronization in a paging device comprising:
    a) inputting a plurality of values associated with a frame of data;
    b) correlating said plurality of input values to a first pattern associated with a paging protocol;
    c) summing said correlated plurality of input values to obtain a first summed correlation value; and
    d) determining that synchronization has occurred if said first summed correlation value reaches a first synchronization threshold,
wherein each of said plurality of input values respectively correspond to a data value of a respective bit position within said associated frame of data, said correlating step is performed by adding a number of said input values to obtain a first correlation value and said summing step is performed by adding said first correlation value to a previous first summed correlation value to obtain said first summed correlation value.

11. The method of claim 10 wherein said first synchronization threshold is obtained by adding said input values used to form said first correlation value to a previous first synchronization threshold to obtain said first synchronization threshold.

12. The method of claim 10 further comprising the step of confirming that a frame synchronization has occurred if said first summed correlation value reaches said first synchronization threshold.

13. The method of claim 12 wherein said confirmation step comprises:
  correlating a portion of said plurality of input values to a second pattern associated with a paging protocol;
  summing said correlated portion of said plurality of input values to obtain a second summed correlation value; and
  determining if said second summed correlation value reaches a second synchronization threshold.

14. The method of claim 13 wherein said second synchronization threshold comprises a summation of a number of said portion of said plurality of input values.

15. The method of claim 14 wherein said second synchronization threshold comprises a summation of thirty-two input values of said portion of said plurality of input values.

16. The method of claim 13 wherein each of said portion of said plurality of input values respectively correspond to a data value of a respective bit position within said associated frame of data and said step of correlating a portion of said plurality of input values is performed by multiplying a number of said portion of said plurality of input values with an associated expected value of said second pattern for the respective bit position.

17. The method of claim 13 wherein each said portion of said plurality of input values respectively correspond to a data value of a respective bit position within said associated frame of data, said step of correlating a portion of said plurality of input values is performed by adding a number of input values of said portion to obtain a second correlation value and said step of summing said correlated portion is performed by adding said second correlation value to a previous second summed correlation value to obtain said second summed correlation value.

18. The method of claim 17 wherein said second synchronization threshold is obtained by adding said input values used to form said second correlation value to a previous second synchronization threshold to obtain said second synchronization threshold.

19. A paging device comprising:
  a demodulating device; and
  a controller coupled to said demodulating device, said controller:
    a) inputting a plurality of values associated with a frame of data taken from said demodulation device;
    b) correlating said plurality of input values to a first pattern associated with a paging protocol;
    c) summing said correlated plurality of input values to obtain a first summed correlation value; and
    d) determining that synchronization has occurred if said first summed correlation value reaches a first synchronization threshold,
wherein said first synchronization threshold comprises a summation of a number of said plurality of input values.

20. The device of claim 19 wherein if said first summed correlation has not reached said first synchronization threshold in step (d), said controller further:
  e) reads a next input value and dropping a prior input value; and
  f) repeats steps (b) through (f) until said first summed correlation value reaches said threshold in step (d).

21. The device of claim 19 wherein said plurality of input values comprise a soft output from said demodulating device.

22. The device of claim 19 wherein said first synchronization threshold comprises a summation of thirty-two input values.

23. The device of claim 19 wherein said first synchronization threshold comprises a summation of a number of said plurality of input values reduced by a first constant.

24. The device of claim 23 wherein said first constant is selected from a range of 0 to 1.

25. The device of claim 24 wherein said first constant is approximately 0.83.

26. The device of claim 19 wherein said controller is a digital signal processor.

27. The device of claim 19 wherein said controller is an application specific integrated circuit (ASIC).

28. The device of claim 19 wherein said controller is a microcomputer.

29. A paging device comprising:
  a demodulating device; and
  a controller coupled to said demodulating device, said controller:
    a) inputting a plurality of values associated with a frame of data taken from said demodulation device;
    b) correlating said plurality of input values to a first pattern associated with a paging protocol;
    c) summing said correlated plurality of input values to obtain a first summed correlation value; and
    d) determining that synchronization has occurred if said first summed correlation value reaches a first synchronization threshold,
wherein each of said plurality of input values respectively correspond to a data value of a respective bit position within said associated frame of data and said controller performs said correlating step by multiplying a number of said input values with an associated expected value of said first pattern for the respective bit position.

30. The device of claim 29 wherein said number of correlated input values is thirty-two.

31. A paging device comprising:
  a demodulating device; and
  a controller coupled to said demodulating device, said controller:
    a) inputting a plurality of values associated with a frame of data taken from said demodulation device;
    b) correlating said plurality of input values to a first pattern associated with a paging protocol;
    c) summing said correlated plurality of input values to obtain a first summed correlation value; and
    d) determining that synchronization has occurred if said first summed correlation value reaches a first synchronization threshold,
wherein each of said plurality of input values respectively correspond to a data value of a respective bit position within said associated frame of data, said controller performs said correlating step by adding a number of said input values to obtain a first correlation value and said summing step by adding said first correlation value to a previous first summed correlation value to obtain said first summed correlation value.

32. The device of claim 31 wherein said first synchronization threshold is obtained by adding said input values used to form said first correlation value to a previous first synchronization threshold to obtain said first synchronization threshold.

33. The device of claim 32 wherein said controller further confirms that a frame synchronization has occurred if said first summed correlation value reaches said first synchronization threshold.

34. The device of claim 33 wherein said controller performs said confirmation step by:
   correlating a portion of said plurality of input values to a second pattern associated with a paging protocol;
   summing said correlated portion of said plurality of input values to obtain a second summed correlation value; and
   determining if said second summed correlation value reaches a second synchronization threshold.

35. The device of claim 34 wherein said second synchronization threshold comprises a summation of a number of said portion of said plurality of input values.

36. The device of claim 34 wherein said second synchronization threshold comprises a summation of thirty-two input values of said portion of said plurality of input values.

37. The device of claim 36 wherein each of said portion of said plurality of input values respectively correspond to a data value of a respective bit position within said associated frame of data and said controller performs said step of correlating a portion of said plurality of input values by multiplying a number of said portion of said plurality of input values with an associated expected value of said second pattern for the respective bit position.

38. The device of claim 36 wherein each of said portion of said plurality of input values respectively correspond to a data value of a respective bit position within said associated frame of data, said controller performs said step of correlating a portion of said plurality of input values by adding a number of input values of said portion to obtain a second correlation value and said step of summing said correlated portion by adding said second correlation value to a previous second summed correlation value to obtain said second summed correlation value.

39. The device of claim 38 wherein said second synchronization threshold is obtained by adding said input values used to form said second correlation value to a previous second synchronization threshold to obtain said second synchronization threshold.

40. A pager comprising:
   a demodulating device; and
   a processor coupled to said demodulating device, said processor being programmed to:
   a) input a plurality of values associated with a frame of data taken from said demodulation device;
   b) correlate said plurality of input values to a first pattern associated with a paging protocol;
   c) sum said correlated plurality of input values to obtain a first summed correlation value; and
   d) determine that synchronization has occurred if said first summed correlation value reaches a first synchronization threshold,
wherein said first synchronization threshold comprises a summation of thirty-two input values.

41. The pager of claim 40 wherein if said first summed correlation has not reached said first synchronization threshold in step (d), said processor further:
   e) reads a next input value and dropping a prior input value; and
   f) repeats steps (b) through (f) until said first summed correlation value reaches said threshold in step (d).

42. The pager of claim 40 wherein said plurality of input values comprise a soft output from said demodulating device.

43. The pager of claim 40 wherein said first synchronization threshold comprises a summation of said thirty-two input values reduced by a first constant.

44. The pager of claim 43 wherein said first constant is selected from a range of 0 to 1.

45. The pager of claim 40 wherein said processor is a digital signal processor.

46. A pager comprising:
   a demodulating device; and
   a processor coupled to said demodulating device, said processor being programmed to:
   a) input a plurality of values associated with a frame of data taken from said demodulation device;
   b) correlate said plurality of input values to a first pattern associated with a paging protocol;
   c) sum said correlated plurality of input values to obtain a first summed correlation value; and
   d) determine that synchronization has occurred if said first summed correlation value reaches a first synchronization threshold,
wherein each of said plurality of input values respectively correspond to a data value of a respective bit position within said associated frame of data and said processor is programmed to correlate said plurality of input values by multiplying a number of said input values with an associated expected value of said first pattern for the respective bit position.

47. A pager comprising:
   a demodulating device; and
   a processor coupled to said demodulating device, said processor being programmed to:
   a) input a plurality of values associated with a frame of data taken from said demodulation device;
   b) correlate said plurality of input values to a first pattern associated with a paging protocol;
   c) sum said correlated plurality of input values to obtain a first summed correlation value; and
   d) determine that synchronization has occurred if said first summed correlation value reaches a first synchronization threshold,
wherein each of said plurality of input values respectively correspond to a data value of a respective bit position within said associated frame of data, said processor is programmed to correlate said plurality of input values by adding a number of said input values to obtain a first correlation value and said processor is programmed to sum said correlated input values by adding said first correlation value to a previous first summed correlation value to obtain said first summed correlation value.

48. The pager of claim 47 wherein said first synchronization threshold is obtained by adding said input values used to form said first correlation value to a previous first synchronization threshold to obtain said first synchronization threshold.

49. The pager of claim 48 wherein said processor is further programmed to confirm that a frame synchronization has occurred if said first summed correlation value reaches said first synchronization threshold.

50. The pager of claim 49 wherein said processor is programmed to confirm that a frame synchronization has occurred by:
   correlating a portion of said plurality of input values to a second pattern associated with a paging protocol;
   summing said correlated portion of said plurality of input values to obtain a second summed correlation value; and
   determining if said second summed correlation value reaches a second synchronization threshold.

51. The pager of claim 50 wherein said second synchronization threshold comprises a summation of thirty-two input values of said portion of said plurality of input values.

52. The pager of claim 51 wherein each of said portion of said plurality of input values respectively correspond to a data value of a respective bit position within said associated frame of data and said processor is programmed to correlate a portion of said plurality of input values by multiplying a number of said portion of said plurality of input values with an associated expected value of said second pattern for the respective bit position.

53. The pager of claim 51 wherein each of said portion of said plurality of input values respectively correspond to a data value of a respective bit position within said associated frame of data, said processor is programmed to correlate a portion of said plurality of input values by adding a number of input values of said portion to obtain a second correlation value and said processor is programmed to sum said correlated portion by adding said second correlation value to a previous second summed correlation value to obtain said second summed correlation value.

54. The pager of claim 53 wherein said second synchronization threshold is obtained by adding said input values used to form said second correlation value to a previous second synchronization threshold to obtain said second synchronization threshold.

* * * * *